United States Patent
Mohrmann

[11] Patent Number: 5,727,469
[45] Date of Patent: Mar. 17, 1998

[54] ROTARY PRINTING PRESS CYLINDER MOUNTING

[75] Inventor: Hans Dierk Mohrmann, Höchberg, Germany

[73] Assignee: Koenig & Bauer-Albert Aktiengesellschaft, Wurzburg, Germany

[21] Appl. No.: 736,487

[22] Filed: Oct. 24, 1996

[30] Foreign Application Priority Data

Oct. 24, 1995 [DE] Germany .......................... 195 39 502.6

[51] Int. Cl.[6] .................................................. B41F 13/10
[52] U.S. Cl. ............................................ 101/375; 384/473
[58] Field of Search ................................. 101/375, 212; 384/466, 473

[56] References Cited

U.S. PATENT DOCUMENTS

| | | | |
|---|---|---|---|
| 4,361,287 | 11/1982 | Morishita et al. | 239/703 |
| 4,541,738 | 9/1985 | Leibensperger et al. | 384/470 |
| 4,541,740 | 9/1985 | Lothar Schard | 384/473 |
| 4,553,264 | 11/1985 | Haugwitz | 455/189.1 |
| 4,952,077 | 8/1990 | Kurt | 384/462 |
| 4,968,157 | 11/1990 | Chiba | 384/462 |
| 5,484,212 | 1/1996 | Guaraldi et al. | 384/462 |

FOREIGN PATENT DOCUMENTS

| | | |
|---|---|---|
| 0290091 | 11/1988 | European Pat. Off. |
| 0353445 | 6/1989 | European Pat. Off. |
| 0363228 | 4/1990 | European Pat. Off. |
| 2 532 017 | 2/1984 | France . |
| 866 745 | 12/1952 | Germany . |
| 25 07 178 | 11/1975 | Germany . |
| 29 51 652 | 11/1980 | Germany . |
| 3211715 | 10/1983 | Germany . |
| 3532037 | 4/1986 | Germany . |
| 44 38 483 | 7/1995 | Germany . |

OTHER PUBLICATIONS

Patent Abstract of Japan JP5332366 Dec. 14, 1993.
Japan JP63167126 Nov. 7, 1988.

*Primary Examiner*—Edgar S. Burr
*Assistant Examiner*—Dave A. Ghatt
*Attorney, Agent, or Firm*—Jones, Tullar & Cooper, P.C.

[57] ABSTRACT

A rotary printing press cylinder mounting utilizes a bearing positioned in an annular bushing and separating the bushing into two chambers. A liquid lubricant is fed directly to the bearing by a feed pipe. A separating wall extends radially inwardly adjacent an inbound side of the bearing. Any lubricant that moves past the separating wall is collected in the inbound chamber and drains to the outboard chamber for return to a sump.

8 Claims, 1 Drawing Sheet

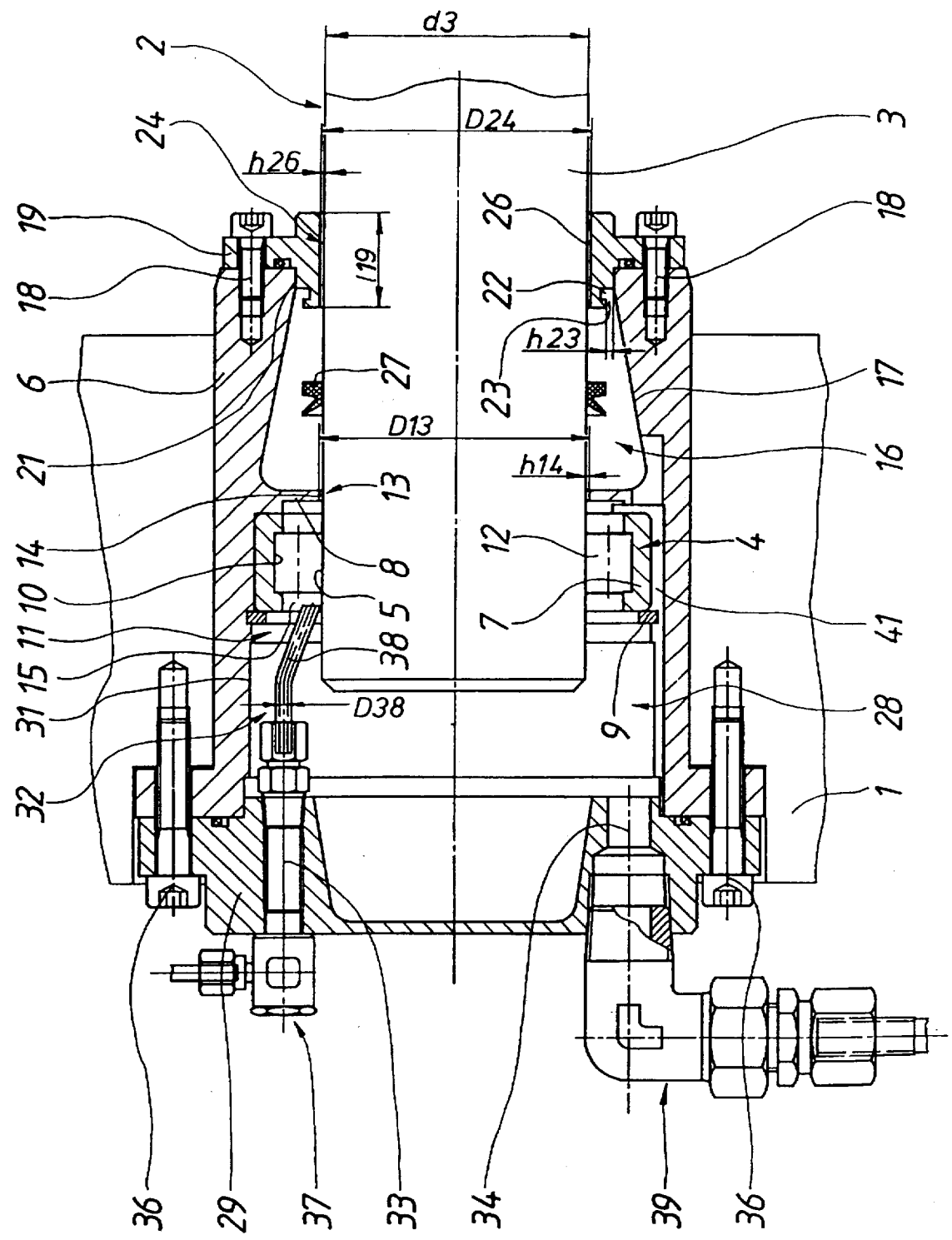

ROTARY PRINTING PRESS CYLINDER MOUNTING

FIELD OF THE INVENTION

The present invention is directed generally to a rotary printing press cylinder mounting. More particularly, the present invention is directed to the mounting of a cylinder of a rotary printing press using a liquid-lubricated bearing. Most specifically, the present invention is directed to a rotary printing press cylinder mounting using a liquid-lubricated bearing and having a lubricant leakage catching chamber. The bearing, which supports an end journal of the printing press cylinder, is disposed in an annular, cylindrical bushing. An inboard chamber and an outboard chamber are defined by the bushing, the lubricated bearing, and by suitable covers. A minimal amount of liquid lubricant, such as oil, is supplied directly to the bearing. Used lubricant flows from the inboard chamber to the outboard chamber and is collected in a drain channel from where it flows out a lubricant discharge line.

DESCRIPTION OF THE PRIOR ART

It is generally known in the prior art to provide various cylinders of rotary printing presses with mountings that include lubricated bearings. A problem with the use of these bearings is that the lubricating medium, typically oil, can leak. Any such oil leakage will be apt to be a problem since it may cause a reduction in the quality of the product being printed by the rotary printing press.

The German Published, Non-Examined Patent Application DE-OS 25 07 178 describes a mounting for a distribution cylinder in a rotary printing press. This prior art mounting has an oil collection chamber with an oil return bore. This oil collection chamber has a significant limitation because no forced, preset return of the oil to the oil-return bore is provided by this assembly.

In the German Patent Publication DE 44 38 483 A1 there is disclosed a lubrication arrangement for a pressure cylinder bearing. In this arrangement, a lubricant is fed through an outer ring, which is provided with openings, and which is part of the pressure cylinder bearing.

Another prior art mounting for a distribution roller in a rotary printing press is shown in the German Patent Publication DE 29 51 652 B1. In this mounting assembly, a rotary shaft seal is used to prevent the overflow of oil. This rotary shaft seal is subjected to wear and thus may fail. This possible failure of the rotary shaft seal means that a secure sealing of the mounting is not possible in this prior art device.

It will thus be seen that a need exists for a mounting for a cylinder of a rotary printing press that overcomes the limitations of the prior art. The rotary printing press cylinder mounting in accordance with the present invention provides such a device and is a significant improvement over the prior art.

SUMMARY OF THE INVENTION

It is an object of the present invention to provide a rotary printing press cylinder mounting.

Another object of the present invention is to provide a mounting of a cylinder in a rotary printing press using a liquid-lubricated bearing.

A further object of the present invention is to provide a rotary printing press cylinder mounting using a liquid-lubricated bearing and having a lubricant leakage collection chamber.

Still another object of the present invention is to provide a rotary printing press cylinder mounting that provides effective sealing in a wear free manner.

Yet a further object of the present invention is to provide a mounting for a cylinder in a rotary printing press which utilizes a minimum amount of a lubricant.

As will be discussed in detail in the description of the preferred embodiment which is presented subsequently, the mounting for a cylinder of a rotary printing press in accordance with the present invention utilizes a bearing assembly, such as a roller bearing, to support the end journal of a rotating and axially displaceable distribution cylinder. The roller bearing has an outer support which is received in an annular or cylindrical bushing. The bearing effectively divides the bushing into an inboard chamber and an outboard chamber. A supply of a lubricant liquid, such as oil, is provided directly to the bearing by a liquid lubricant feed pipe or tube. A separating wall is formed in the bushing just inboard of the bearing and prevents flow of the majority of the lubricant inboard along the cylinder journal past the wall. Any lubricant that does flow axially inwardly past this separating wall, is collected either by a lubricant collection groove on an inboard cover, or is slung onto the radial outer walls of the inboard chamber by a splash ring. A lubricant drain channel directs any collected lubricant from the inboard chamber back to the outboard chamber. A liquid lubricant discharge line is attached to a bottom portion of an outboard cover for the outboard chamber. The collected oil is removed through this discharge line and is then re-used.

The rotary printing press cylinder mounting in accordance with the present invention accomplishes a wear free sealing of the cylinder mounting, which may be a distribution cylinder. The support bearing is designed to operate with a minimal amount of lubricant and thus requires only that minimal amount of lubricating oil to operate properly. This small amount of liquid lubricant is supplied directly to the bearing by the liquid lubricant feed pipe or tube. This means that only small amounts of lubricant are present in the area surrounding the bearing and thus there is only a small amount of spent or used liquid lubricant which must be collected and removed. The bearing is disposed in the support bushing adjacent an axially inboard separating wall. This wall effects a substantial limitation on the amount of liquid lubricant which can flow axially inboard along the cylinder journal. This separating wall thus cooperates with the cylinder journal to form a gap seal. Even the small amounts of lubricant liquid which pass through this gap seal are returned to the lubricant liquid reservoir. The inboard chamber is shaped to direct the flow of liquid lubricant back to the outboard chamber where it is returned to the lubricant reservoir. This interior chamber has a tapering cross-sectional shape.

A splash ring is secured to the cylinder journal inboard of the separating wall. This splash ring slings oil from the cylinder journal radially outwardly onto the tapering wall surface of the inboard chamber. This oil eventually finds its way to either a lubricant collection groove on the inboard chamber cover, or to a lubricant drain channel. The spent lubricant liquid returns to the outboard chamber and is directed to the lubricant discharge line which returns it to a suitable sump or the like.

The rotary printing press cylinder mounting in accordance with the present invention overcomes the limitations of the prior art. It is a substantial advance in the art.

BRIEF DESCRIPTION OF THE DRAWINGS

While the novel features of the rotary printing press cylinder mounting in accordance with the present invention are set forth with particularity in the appended claims, a full and complete understanding of the invention may be had by referring to the detailed description of the preferred embodiment which is set forth hereinafter, and as illustrated in the accompanying sole drawing FIGURE which is a schematic sectional view of the cylinder mounting in accordance with the present invention.

DETAILED DESCRIPTION OF THE PREFERRED EMBODIMENT

Referring now to the sole drawing FIGURE, there may be seen a cylinder 2, which may be, for example a distribution cylinder 2 of a rotary printing press and which is seated at both of its ends in lateral frames 1 of the rotary printing press. This distribution cylinder 2 rotates, for example, at a speed n=1200 rpm, and in the process also performs an oscillating movement in the axial direction with a stroke of, for example, approximately ±15 mm and a frequency of 2 Hz. The mounting of this distribution cylinder 2 on only one side will be described in what follows. The associated mounting, which is disposed in the second lateral frame, is correspondingly accomplished.

A cylinder journal 3, with a diameter d3 of, for example d3=66 mm, of the distribution cylinder 2 is rotatably and axially displaceably seated in a cylindrical, annular bushing 6 by means of a bearing and, in particular by a roller bearing 4, for example a cylindrical roller bearing 4. An outer ring or race 7 of the cylindrical roller bearing 4 is fastened, such as by being fixed on the bushing, in a bore 11 of the bushing 6 between a radially inwardly directed separating wall 8 and a locking ring 9. Roller bodies, for example cylindrical rollers 12 of the preferably hardened, cylindrical roller bearing 4 roll off on a bearing surface 5 that is provided directly on the cylinder journal 3. It is also possible for an inner ring or race of bearing 4, which can form the bearing surface 5, to be placed on the journal 3. The cylindrical rollers 12 of the roller bearing 4 therefore roll off between a bearing surface 10 of the outer ring or race 7 and the bearing surface 5 connected with the journal 3 and are preferably arranged fixed in place in the axial direction.

The radially inwardly directed bushing separating wall 8 is disposed on the bushing 6 at an inboard side of the bearing 4 to be sealed and has a central bore 13, whose diameter D13, for example D13=66.3 mm, is slightly larger than the diameter d3 of the journal 3. A circumferential annular gap 14 of a height h14, for example h14=0.15 mm, is formed between the inner edge of the separating wall 8 and the surface of journal 3. This separating wall 8 defines an inboard chamber 16 that extends in bushing 6 in the axial direction toward the distribution cylinder 2. Inboard chamber 16 is formed, in the radial direction, by a surface area 17 of bushing 6 which extends conically, for example, and on the side oriented toward the distribution roller 2 by a cover 19, which is concentrically fastened on the bushing 6 by means of threaded screws 18. Thus, the inboard chamber 16 has a cross section which tapers in the direction toward a barrel (not shown) of the distribution cylinder 2. The cover 19, that is attached to the tapering inner end of the chamber 16, has a length l19, for example l19=24 mm. On its side facing into the inboard chamber 16 the cover 19 is provided with a collar having a collar shoulder 21. Into an outboard facing surface of collar shoulder 21 a U-shaped, for example, annular lubricant collection groove 22 has been cut. Groove 22 is open in the direction toward the radial outer surface area 17 of the chamber 16. A ring-shaped gap 23 of a height h23, for example h23=3 mm, results between this shoulder 21 and the radial outer surface area 17 of the chamber 16, so that the chamber 16 is connected with the annular lubricant collection groove 22. The cover 19, with the length l19 of, for example l19=24 mm, is provided with a center bore 24, whose diameter D24, for example D24=66.3 mm, is slightly larger than the diameter d3 of the journal 3 of the distribution cylinder 2. This creates an annular gap 26 of a height h26, for example h26=0.15 mm, and a depth t26=l19, for example l19=24 mm.

A rotating splash ring 27, which is connected in a torsion-proof manner with the distribution cylinder 2, is provided at approximately the axial center of the inboard chamber 16 on the journal 3 of the distribution cylinder 2. As depicted in the preferred embodiment, this splash ring 27 can be embodied as a pushed-on, commercially available V-sealing ring. It can also be formed by at least two annular grooves with a cross section in the shape of a segment of a circle, which are cut into the journal 3 and which are placed next to each other, so that a tapering splash ring is created. It is of course also possible to arrange several splash rings next to each other along the length of the cylinder journal 3.

A second, outboard chamber 28 is provided in the bushing 6 on the side of the cylindrical roller bearing 4 facing away from the barrel of the distribution cylinder 2. In the axial direction, this outboard chamber 28 is defined by the cylindrical roller bearing 4 on the journal 3, and by an outboard cover 29. In the radial direction, chamber 28 is defined by a surface area 31 of a bore 32 cut into the bushing 6. The outboard cover 29 is provided with a first, cover bore 33, which is located in the top of the cover 29, and with a second continuous cover bore 34 that is located in the bottom of cover 29. Cover 29 is secured to the outboard face of the bushing 6 by means of threaded screws 36. A feed line 37 for a liquid lubricant, for example oil, is screwed to an outward facing end of the first, top cover bore 33. A lubricant feed pipe 38, which extends as far as directly over a distance of approximately 2 mm, for example, to the cylindrical rollers 12, and which is utilized for the directed feeding of lubricant, is connected at its free end inside a gap 15 between the two bearing surfaces 5 and 10 of the bearing 4. An interior diameter D38, for example D38=4 mm, of this liquid lubricant feed pipe 38 is adapted to supply a defined amount of lubricant to the cylindrical roller bearing 4. A discharge line 39 is disposed on the outward facing end of the second, bottom cover bore 34, and terminates approximately in the lowest area of the outboard chamber 28; i.e. in the "bottom" of the outboard chamber 28.

A bore or a groove 41 is formed in the bushing 6 below the outer ring 7 of the cylindrical roller bearing 4 and extends from this outboard chamber 28 to the first or inboard chamber 16, so that the first chamber 16 and second chamber 28 are connected with each other. This bore or groove 41, which forms a lubricant drain channel, is disposed to extend obliquely in such a way that it extends slopingly or at a "slope" from a bottom of the first, inboard chamber 16 to the bottom of the second, outboard chamber 28. Except for this bore, or lubricant drain channel 41, the inboard chamber 16, with the journal 3 extending through it, is closed on all sides.

The operation of the rotary printing press cylinder mounting, in accordance with the present invention, will now be discussed in detail. The liquid lubricant feed pipe 38 is supplied with liquid lubricant, for example oil, via the liquid lubricant feed line 37. The lubricant is conducted, in a metered way, through the feed pipe 38 directly into the cylindrical roller bearing 4. The amount, for example $V_{zu}=$ 25 cm$^3$/min, of the supplied liquid lubricant corresponds to a minimum amount $V_{min}$ required by the cylindrical roller bearing 4 in order to assure satisfactory lubrication of the cylindrical roller bearing 4. The lubricant is evenly distributed in the cylindrical roller bearing 4 and on the journal 3 by the rotating and oscillating movement of the journal 3. Because of this minimal amount of lubrication supplied to the bearing 4, only a very little amount of lubricant reaches the area of the separating wall 8 that is used as the gap seal. Very little lubricant is conveyed through the annular gap 14 between the separating wall 8 and the journal 3. This remaining lubricant can flow as far as the splash ring 27. This remaining lubricant is conveyed to the edge of the splash ring 27 by the centrifugal forces occurring at the splash ring 27, which rotates rapidly with the distribution cylinder 2. The rotating splash ring 27 flings the lubricant in the direction toward the radial outer surface area 17 of the inboard chamber 16, to which the lubricant now adheres. Because of the tapering conical shape of the inboard chamber 16, the lubricant is moved back by gravity in the direction toward the bottom of the chamber 16 and the cylindrical roller bearing 4. If nevertheless, a small partial amount of the lubricant reaches the tapered inboard end of the inboard chamber 16, this partial amount, which flows downward because of gravity, is received by the U-shaped annular groove 22 in the shoulder 21 of the inboard cover 19 and is also conducted to the bottom of the chamber 16. In this case this annular groove 22 assures a return flow of the liquid lubricant along the cover 19 toward the bottom of the inboard chamber 16 without the journal 3 being again moistened by lubricant. The return flow of the lubricant reaches the second outboard chamber 28 in front of the cylindrical roller bearing 4 through the lubricant drain channel 41. From this outboard chamber 28, the lubricant flows into the discharge line 39 and is returned there to a lubricant reservoir or sump where it can be processed and re-used.

While a preferred embodiment of a rotary printing press cylinder mounting in accordance with the present invention has been set forth fully and completely hereinabove, it will be apparent to one of skill in the art that a number of changes in, for example, the overall size of the cylinder, the drive assembly for the cylinder, the specific liquid lubricant utilized, and the like could be made without departing from the true spirit and scope of the present invention which is accordingly to be limited only by the following claims.

What is claimed is:

1. A mounting for a cylinder of a rotary printing press comprising:
   a cylinder journal;
   a liquid lubricated bearing mounted on, and supporting said cylinder journal;
   an annular bushing supporting said bearing;
   a lubricant leak catching chamber disposed in said bushing on an inboard side of said bearing;
   a separating wall on said bushing adjacent said inboard side of said bearing at an outboard end of said chamber; and
   an inboard cover secured to said bushing at an inboard end of said chamber, said separating wall and said inboard cover forming first and second annular gaps with respect to said cylinder journal, said annular gaps each having a small height.

2. The mounting in accordance with claim 1 further including a lubricant drain channel in said chamber, said channel being situated at a low point in said chamber.

3. The mounting in accordance with claim 1 wherein said chamber has a tapering cross-sectional shape in an axial direction of said cylinder journal.

4. The mounting in accordance with claim 1 further including a lubricant collection groove in said cover, said lubricant collection groove opening into each chamber.

5. The mounting in accordance with claim 2 wherein said lubricant drain channel extends from said chamber beneath said bearing.

6. The mounting in accordance with claim 1 further including a splash ring secured to said cylinder journal in said chamber.

7. The mounting in accordance with claim 1 wherein said cylinder journal is supported in said bearing for rotational and axially oscillating movement.

8. A mounting for a cylinder of a rotary printing press comprising:
   a cylinder journal;
   a liquid lubricated bearing mounted on said cylinder journal;
   an annular bushing supporting said bearing;
   a separating wall on said bushing adjacent an inboard side of said bearing, said bearing and said separating wall dividing said annular bushing into an inboard chamber and an outboard chamber, said inboard chamber having an inboard end and said outboard chamber having an outboard end;
   an inboard cover on said inboard end of said inboard chamber;
   an outboard cover on said outboard end of said outboard chamber;
   a lubricant feed line passing through said outboard cover and terminating at said bearing; and
   a lubricant drain line in said outboard cover to receive spent lubricant.

\* \* \* \* \*